Patented Aug. 27, 1946

UNITED STATES PATENT OFFICE 2,406,577

EXTRACTION OF IRON FROM TITANIFEROUS ORES

Hugh V. Alessandroni, New York, and Borivoj V. Sterk, Woodside, N. Y., assignors to National Lead Company, New York, N. Y., a corporation of New Jersey No Drawing. Application August 8, 1942, Serial No. 454,185

6 Claims. (Cl. 23—87)

The present invention relates to the extraction of iron from iron-containing titaniferous ores. It has especial reference to the extraction of iron from titaniferous ore of the type of ilmenite by means of hydrochloric acid.

The principal object of the invention is to provide a simple method for increasing the recovery of iron from iron-containing titaniferous ores. Another object of the invention is to effect economies in the separation of the iron from titanium contained in iron-containing titaniferous ores, particularly by shortening the time required for the separation. Still another object of the invention is to provide a practical method for obtaining a valuable titanium-bearing concentrate from iron-containing titaniferous ores. These and other objects of the invention will become apparent from this description of the invention.

It is known that iron containing titanium ores, e. g., ilmenite, may be attacked by hydrochloric acid when the concentration of the acid and the temperature of the treatment are controlled. For instance, when using a concentrated hydrochloric acid if the temperature is maintained below about 70° C., the iron and titanium are taken into solution. When the temperature is maintained above about 70° C. up to the boiling point, any titanium which may be dissolved is reprecipitated and there results a solution relatively rich in iron and poor in titanium. The use of the well known counter current principle has been suggested for the treatment of the titaniferous ore with the acid as well as the boiling of the ore-acid mixture under a reflux condenser. Regardless of the procedure employed, the separation of the iron from the titanium has never been effected entirely satisfactorily; some iron has always remained in the titanium containing residues and some titanium has been carried into solution with the iron. By means of the present invention it is possible, while shortening the time of the treatment, to increase the amount of iron taken into solution while decreasing the amount of titanium dissolved.

Broadly considered, the present invention contemplates the treatment of an iron containing titaniferous ore at temperatures above about 70° C. with hydrochloric acid the chlorine ion concentration of which has been increased by the addition of soluble chloride salts. The improved results of the present invention are based upon the observation that when chloride salts have been added to hydrochloric acid the so treated acid will more effectively remove iron from iron containing titaniferous ores. The chloride salts which are effective in the practice of the present invention are broadly a chloride which is soluble in hydrochloric acid. Generally speaking, the nature of the anion is of no particular importance; the improved results of the invention being dependent upon the increase of the chlorine ion concentration. Thus, for example, chlorides of the alkali metals, alkaline earth metals as well as those of aluminum may be employed in the practice of the invention. The minimum amount of a salt which may be added to produce improved results is about 0.5 mol per liter of hydrochloric acid employed. The maximum amount of added salt is determined by the solubility of that salt and its cost. I prefer to use a molarity of about one since it achieves the desired effect without excessive and expensive use of salts. For the best results the concentration of the hydrochloric acid should be about 230 grams HCl per liter, i. e. an acid having a specific gravity of about 1.10. The chloride salt may be dissolved in the acid prior to treating the titaniferous ore, or it may be added during the treatment. According to the invention, the treatment of the titaniferous ore with the chloride-containing hydrochloric acid will be carried out until a substantial dissolution of the iron contained in the ore is effected. A period of treatment varying between about three hours and five hours will, in nearly all cases, prove effective.

The results of many experiments indicate the improved effects of the present invention. For example, when treating ilmenite with hydrochloric acid for the same period of time in the proportion of about 0.702 part HCl per one part ore and using various chlorides, results expressed in the following table were obtained:

Table I

| Exp. No. | Salt concentration molarity | Temperatures, °C. | | Final extraction | |
|---|---|---|---|---|---|
| | | Start | End | Per cent Fe | Per cent TiO$_2$ |
| 1 | None (control) | 109.5 | 108.1 | 81.8 | 0.46 |
| 2 | 0.5 CaCl$_2$ | 110.8 | | 89.7 | 0.49 |
| 3 | 1.0 CaCl$_2$ | 110.3 | 110.8 | 89.0 | 0.16 |
| 4 | 1.1 NaCl | 111.0 | 110.9 | 91.2 | 0 |
| 5 | 1.1 AlCl$_3$ | 111.5 | 114.0 | 96.8 | 0.46 |

The increasing rate of extraction of iron according to the present invention is shown in the following table:

Table II

| Hours boil | No salt added | | | 1.0 mol CaCl$_2$ added | | |
|---|---|---|---|---|---|---|
| | °C. | Per cent Fe[1] | Per cent TiO$_2$[1] | °C. | Per cent Fe[1] | Per cent TiO$_2$[1] |
| Start | 109.5 | 18.3 | 7.28 | 110.3 | 24.9 | 13.44 |
| 0.5 | 109.6 | 22.1 | 3.31 | 111.1 | 52.4 | 2.43 |
| 1 | 109.4 | 42.8 | 2.71 | 111.0 | 71.2 | 1.09 |
| 2 | 108.8 | 64.0 | 1.23 | 110.9 | 82.2 | 0.624 |
| 3 | 108.3 | 78.4 | 0.764 | 110.8 | 88.3 | 0.468 |
| 4 | 108.2 | 81.4 | 0.612 | 110.8 | 88.7 | 0.312 |
| 5 | 108.1 | 81.8 | 0.458 | 110.8 | 89.0 | 0.156 |

[1] Extracted.

The present invention is adaptable to a treatment of titaniferous ore in a multiple stage procedure, for example, a concurrent extraction. When so employing the present invention, the beneficial effect of the chloride salt addition is observed primarily in the first stage where fresh ore is treated with partially spent acid. By increasing the extraction in the first step, the leaching effect in the second stage is improved appreciably because of the presence of a greater amount of excess acid in the latter stage. This effect is illustrated in the following table, showing comparable experiments:

*Table III*

|  | Exp. No. | |
| --- | --- | --- |
|  | 1 | 2 |
| Chloride added | None | 1 mol CaCl$_2$ at second stage. |
| Percent Fe extracted in 1st stage | 22.7 | 36.1. |
| Overall extraction: Percent Fe removed | 93.7 | 97.4. |

With respect to the above table it is to be noted that the spent acid used in the first stage of the extraction of Experiment 2 contained calcium chloride which was added to fresh acid used in the second stage of a previous extraction. In this experiment shown in Table III, 1 mol calcium chloride was added per liter of fresh acid used in the second stage. The spent acid used in the first stage of Experiment 1 and the fresh acid used in the second stage contained no added chloride.

From the foregoing it will be seen that the present invention brings about important economical advantages in the separation of the iron and titanium contained in iron bearing titaniferous ores.

We claim:

1. Method for extracting iron from titaniferous ores which comprises dissolving in hydrochloric acid of a specific gravity approximately 1.10 at least 0.5 mol of a soluble chloride salt selected from the group consisting of the chlorides of the alkali metals, the alkaline earth metals and aluminum per liter of acid, admixing the so-treated acid with ground iron-containing titaniferous ore, heating the mixture at temperature between 70° C. and the boiling point of said mixture until a substantial dissolution of the iron contained in the said ore is effected, and separating the undissolved residues from the iron-containing solution.

2. Method for extracting iron from titaniferous ores which comprises dissolving in hydrochloric acid of a specific gravity approximately 1.10 at least 0.5 mol of a soluble alkali metal chloride per liter of acid, admixing the so-treated acid with ground iron-containing titaniferous ore, heating the mixture at temperature between 70° C. and the boiling point of said mixture until a substantial dissolution of the iron contained in the said ore is effected, and separating the undissolved residues from the iron-containing solution.

3. Method for extracting iron from titaniferous ores which comprises dissolving in hydrochloric acid of a specific gravity approximately 1.10 at least 0.5 mol of a soluble alkaline earth metal chloride per liter of acid, admixing the so-treated acid with ground iron-containing titaniferous ore, heating the mixture at temperature between 70° C. and the boiling point of said mixture until a substantial dissolution of the iron contained in the said ore is effected, and separating the undissolved residues from the iron-containing solution.

4. Method for extracting iron from titaniferous ores which comprises dissolving in hydrochloric acid of a specific gravity approximately 1.10 approximately 1.0 mol of calcium chloride per liter of acid, admixing the so-treated acid with ground iron-containing titaniferous ore, heating the mixture at temperature between 70° C. and the boiling point of said mixture until a substantial dissolution of the iron contained in the said ore is effected, and separating the undissolved residues from the iron-containing solution.

5. Method for extracting iron from titaniferous ores which comprises dissolving in hydrochloric acid of a specific gravity approximately 1.10 approximately 1.0 mol of aluminum chloride per liter of acid, admixing the so-treated acid with ground iron-containing titaniferous ore, heating the mixture at temperature between 70° C. and the boiling point of said mixture until a substantial dissolution of the iron contained in the said ore is effected, and separating the undissolved residues from the iron-containing solution.

6. Method for extracting iron from titaniferous ores which comprises dissolving in hydrochloric acid of a specific gravity approximately 1.10 at least 0.5 mol of sodium chloride per liter of acid, heating the mixture between 70° C. and the boiling point of said mixture until a substantial dissolution of the iron contained in the said ore is effected, and separating the undissolved residues from the iron-containing solution.

HUGH V. ALESSANDRONI.
BORIVOJ V. STERK.